United States Patent
Lyman et al.

(10) Patent No.: US 8,719,386 B2
(45) Date of Patent: May 6, 2014

(54) SYSTEM AND METHOD FOR PROVIDING CONFIGURATION SYNCHRONICITY

(75) Inventors: Christopher Lyman, Los Angeles, CA (US); Samy Kamkar, Marina Del Rey, CA (US)

(73) Assignee: Fonality, Inc., Plano, TX (US)

( * ) Notice: Subject to any disclaimer, the term of this patent is extended or adjusted under 35 U.S.C. 154(b) by 0 days.

(21) Appl. No.: 12/319,693

(22) Filed: Jan. 8, 2009

(65) Prior Publication Data

US 2010/0174807 A1    Jul. 8, 2010

(51) Int. Cl.
*G06F 15/177*    (2006.01)

(52) U.S. Cl.
USPC ........... 709/221; 709/220; 709/222; 709/227; 717/174

(58) Field of Classification Search
USPC ............................ 709/222, 221, 227; 717/174
See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,104,711 A | 8/2000 | Voit | |
| 6,137,869 A | 10/2000 | Voit | |
| 6,282,574 B1 | 8/2001 | Voit | |
| 6,359,880 B1 | 3/2002 | Curry | |
| 6,389,132 B1 | 5/2002 | Price | |
| 6,400,719 B1 | 6/2002 | Chimura et al. | |
| 6,418,214 B1 | 7/2002 | Smythe et al. | |
| 6,430,275 B1 | 8/2002 | Voit | |
| 6,430,289 B1 | 8/2002 | Liffick | |
| 6,453,038 B1 | 9/2002 | McFarlane et al. | |
| 6,628,765 B1 | 9/2003 | Bangs et al. | |
| 6,718,030 B1 | 4/2004 | Turner et al. | |
| 6,782,412 B2 | 8/2004 | Brophy et al. | |
| 6,820,083 B1 | 11/2004 | Nagy et al. | |
| 6,937,703 B1 | 8/2005 | Andreason | |
| 6,964,370 B1 | 11/2005 | Hagale et al. | |
| 7,007,074 B2 | 2/2006 | Radwin | |
| 7,031,442 B1 | 4/2006 | Neyman et al. | |
| 7,035,619 B1 | 4/2006 | Fargano et al. | |
| 7,035,923 B1 | 4/2006 | Yoakum et al. | |
| 7,039,165 B1 | 5/2006 | Saylor et al. | |

(Continued)

FOREIGN PATENT DOCUMENTS

| | | |
|---|---|---|
| WO | 2004049121 A2 | 6/2004 |
| WO | 2005036330 A2 | 4/2005 |
| WO | 2006020168 A2 | 2/2006 |

OTHER PUBLICATIONS

Inter-Tel, Inc. "Advanced Applications Design Guide for Contact Center Suite." Issue 1. Apr. 2006.

(Continued)

*Primary Examiner* — Kyung H Shin
(74) *Attorney, Agent, or Firm* — Carr & Ferrell LLP

(57) ABSTRACT

Systems and methods for providing configuration synchronicity is provided. In exemplary embodiments, a configuration file is generated based on received configuration information. The configuration file may then be stored and queued up for download to at least one communication server to configure the communication server. Subsequently, a verification process is performed to confirm that the configuration file is correctly written to disk by the communication server.

22 Claims, 6 Drawing Sheets

(56) References Cited

U.S. PATENT DOCUMENTS

| | | |
|---|---|---|
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 * | 3/2007 | Donker et al. ............... 709/223 |
| 7,274,781 B2 | 9/2007 | Lipton et al. |
| 7,333,976 B1 | 2/2008 | Auerbach et al. |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 | 4/2010 | Shaffer et al. |
| 7,711,104 B1 | 5/2010 | Flockhart et al. |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,131,872 B2 * | 3/2012 | Kennedy et al. ............... 709/241 |
| 8,132,001 B1 | 3/2012 | Patten et al. |
| 8,223,941 B2 | 7/2012 | White et al. |
| 8,379,832 B1 | 2/2013 | Lyman |
| 8,571,202 B2 | 10/2013 | Lyman |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0219029 A1 | 11/2003 | Pickett |
| 2003/0228010 A1 | 12/2003 | Clarisse et al. |
| 2004/0001573 A1 | 1/2004 | Gusler et al. |
| 2004/0039889 A1 * | 2/2004 | Elder et al. ............... 711/162 |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 * | 6/2004 | Donker et al. ............... 709/218 |
| 2004/0133888 A1 * | 7/2004 | Ard et al. ............... 717/174 |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gulser et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0100923 A1 | 5/2006 | Courchesne |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song et al. |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 * | 11/2007 | Zeldin ............... 358/1.13 |
| 2008/0025316 A1 | 1/2008 | Zampiello et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 * | 6/2008 | Redjaian et al. ............... 709/222 |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 * | 1/2009 | Lashley et al. ............... 707/203 |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 * | 4/2009 | Plumb ............... 709/227 |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2010/0174807 A1 | 7/2010 | Lyman |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins, John et al. |

OTHER PUBLICATIONS

"Enhanced Enterprise Communication: Transforming the bank into a proactive relationship center."
"Network Intelligence for Presence Enhanced Communication."
"Presence Aggregation in Endpoints."
Hull, et al., Enabling Context-Aware and Privacy-Conscious User Data Sharing, 2004, Proceedings of the 2004 IEEE International Conference on Mobile Data Management.
Broder, et al., Search Advertising Using Web Relevance Feedback, 2008, pp. 1013-1022, Conference on Information and Knowledge Management, Proceeding of the 17th AC conference on Information and Knowledge Management.
"What is Xact View?" Xact View User Guide, Schmooze Communications LLC 2008. www.schmooze.com.

* cited by examiner

SYSTEM AND METHOD FOR PROVIDING CONFIGURATION SYNCHRONICITY

BACKGROUND OF THE INVENTION

1. Field of the Invention

Embodiments of the present invention relate generally to communication systems and more particularly to providing synchronization of communication system configurations.

2. Description of Related Art

Conventionally, communication servers may be individually configured with preferences for various inbound and outbound communications as well as preferences for coupled communication devices. Typically, a system administrator will access each communication server and input data to establish the preferences and set up of the communication devices. When multiple communication servers are present, this may become a time consuming process, especially if the communication servers are not co-located.

Another disadvantage of conventional communication server architecture is that the changes made to one communication server may not be easily provided to other communication servers. In some situations, the changes will need to be configured individually within each of the communication servers in order for the entire communication system to function appropriately.

Thus, it would be desirable to provide a mechanism for centralized configuration management.

SUMMARY OF THE INVENTION

Embodiments of the present invention provide systems and methods for synchronizing configuration files. In exemplary embodiments, a configuration file is generated based on received configuration information. The configuration file may comprise preferences and settings for various communication servers and communication devices that are coupled to the communication server.

Once generated, the configuration file may then be stored and queued up for download to at least one communication server to configure the communication server accordingly. In exemplary embodiments, the configuration file is stored in a configuration database of a NFS server. The NFS server may also comprise a file queue for queuing up the configuration files which need to be provided to the communication server.

At a time when the communication server is available, the configuration file is sent to the communication server. Subsequently, a verification process is performed to confirm that the configuration file is correctly written to disk by the communication server. In exemplary embodiments, the verification process comprises comparing a hash value associated with the configuration file generated by the receiving communication server to local hash data at a data center system.

DETAILED DESCRIPTION OF EXEMPLARY EMBODIMENTS

Embodiments of the present invention provide systems and methods for providing configuration synchronicity for communication systems. In exemplary embodiments, a centralized location maintains and updates configuration files for various communication systems. These communication systems may be located at a plurality of sites (e.g., customer sites). By maintaining configuration files for the communication systems within a centralized location, various components of the communication systems may be easily updated from the centralized location.

Figure 1:
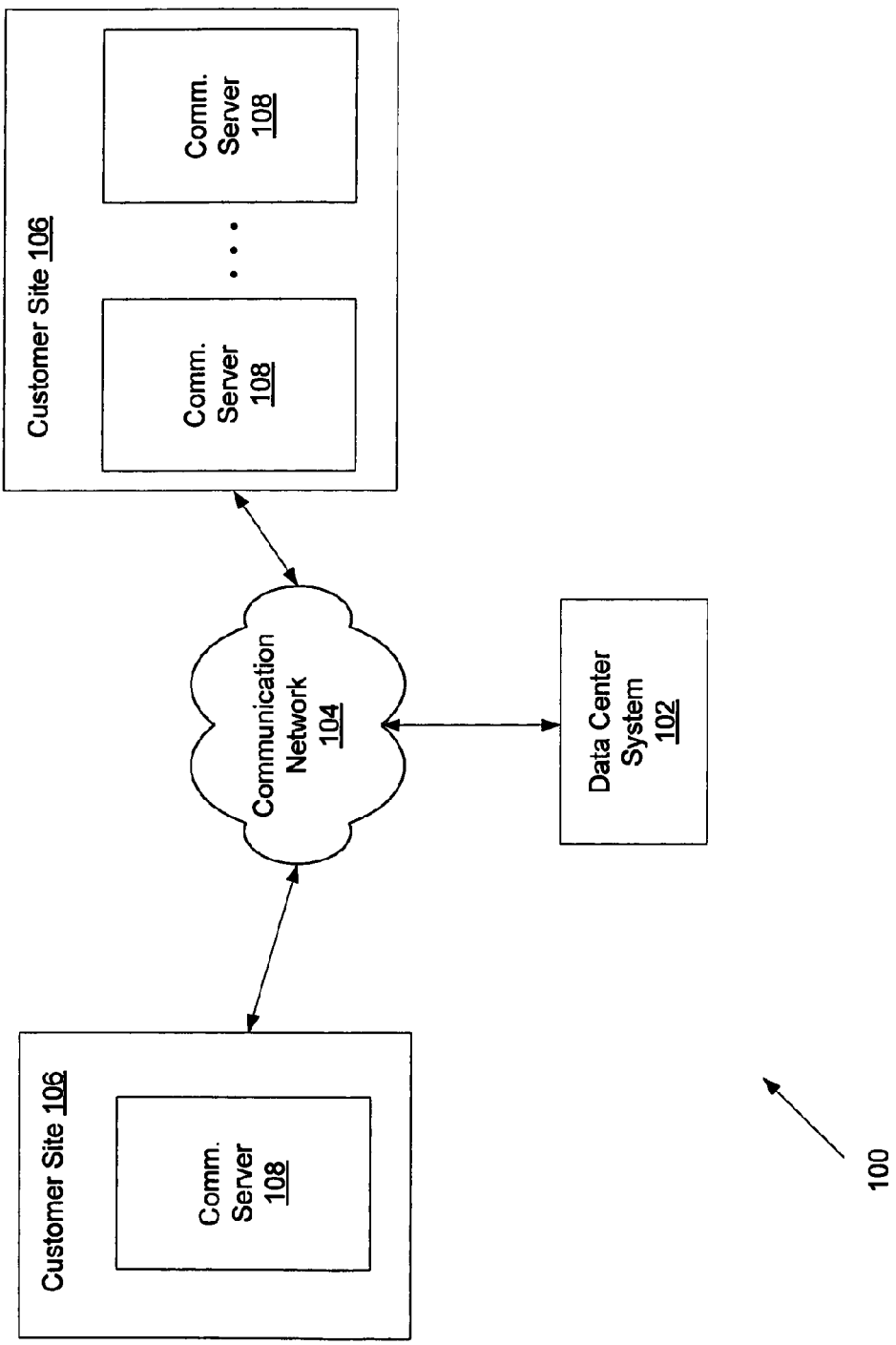
FIG. 1 is a diagram of an exemplary environment in which embodiments of the present invention may be practiced.

FIG. 1 shows an exemplary environment 100 in which embodiments of the present invention may be practiced. The exemplary environment 100 comprises a data center system 102 coupled via a communication network 104 to a plurality of customer sites 106. The communication network 104 may comprise one or more local area networks (LAN) or wide area networks (WAN), such as the Internet.

The data center system 102 is configured to be a centralized location used to generate, maintain, and update configuration files for the customer sites 106. While only one data center system 102 is shown in the exemplary environment 100, alternative embodiments may comprise more than one data center system 102. For example, data center systems 102 may be regionally established. The data center system 102 will be discussed in more detail in connection with FIG. 2 and FIG. 3.

The customer site 106 may comprise one or more communication servers 108. The communication servers 108 provide communication functionality to each customer site 106. These communication servers 108 may comprise, for example, PBX servers, e-mail servers, chat servers, or any other type of server used to manage communications within the customer site 106. Any number of different customers may have customer sites 106 coupled to the data center system 102.

The communication servers 108 may be provided to the customer site 106 with modules and data which allow the communication servers 108 to function with the data center system 102. The modules and data may be preinstalled in the communication servers 108. Alternatively, the modules and data may be downloaded to the communication server 108 upon an initial configuration of the communication servers 108. In some embodiments, the modules may include a pinging module configured to send an outbound ping to the data center system 102 for available configuration files.

In exemplary embodiments, the data may include a unique customer identifier and associated information. The unique customer identifier allows the data center system 102 to identify the communication server 108 as a particular customer. This data will be important when determining which communication servers 108 should receive new or updated configuration files.

In exemplary embodiments, the communication servers 108 may contain and/or utilize configuration files. These configuration files comprise preferences and settings for the communication server 108 and communication devices that are coupled to the communication server 108. For example, the configuration file may establish a call routing scheme as discussed in more detail in connection with U.S. patent application Ser. No. 12/069,083 entitled "Intelligent Presence Management in Communication Routing System," which is incorporated herein by reference. In another example, the configuration file may enable communication and status monitoring for certain communication devices as discussed in more detail in connection with U.S. patent application Ser. No. 11/827,314 entitled "System and Method for Centralized Presence Management of Local and Remote Users," which is also incorporated herein by reference. Other configuration files may be directed to adding extensions, establishing dial plans, and linking communication servers 108 associated with the customer site 106.

It should be noted that the environment 100 of FIG. 1 is exemplary. Alternative embodiments may comprise any number of data center systems 102, customer sites 106 and communication servers 108 coupled together and still be within the scope of exemplary embodiments of the present invention.

Figure 2:
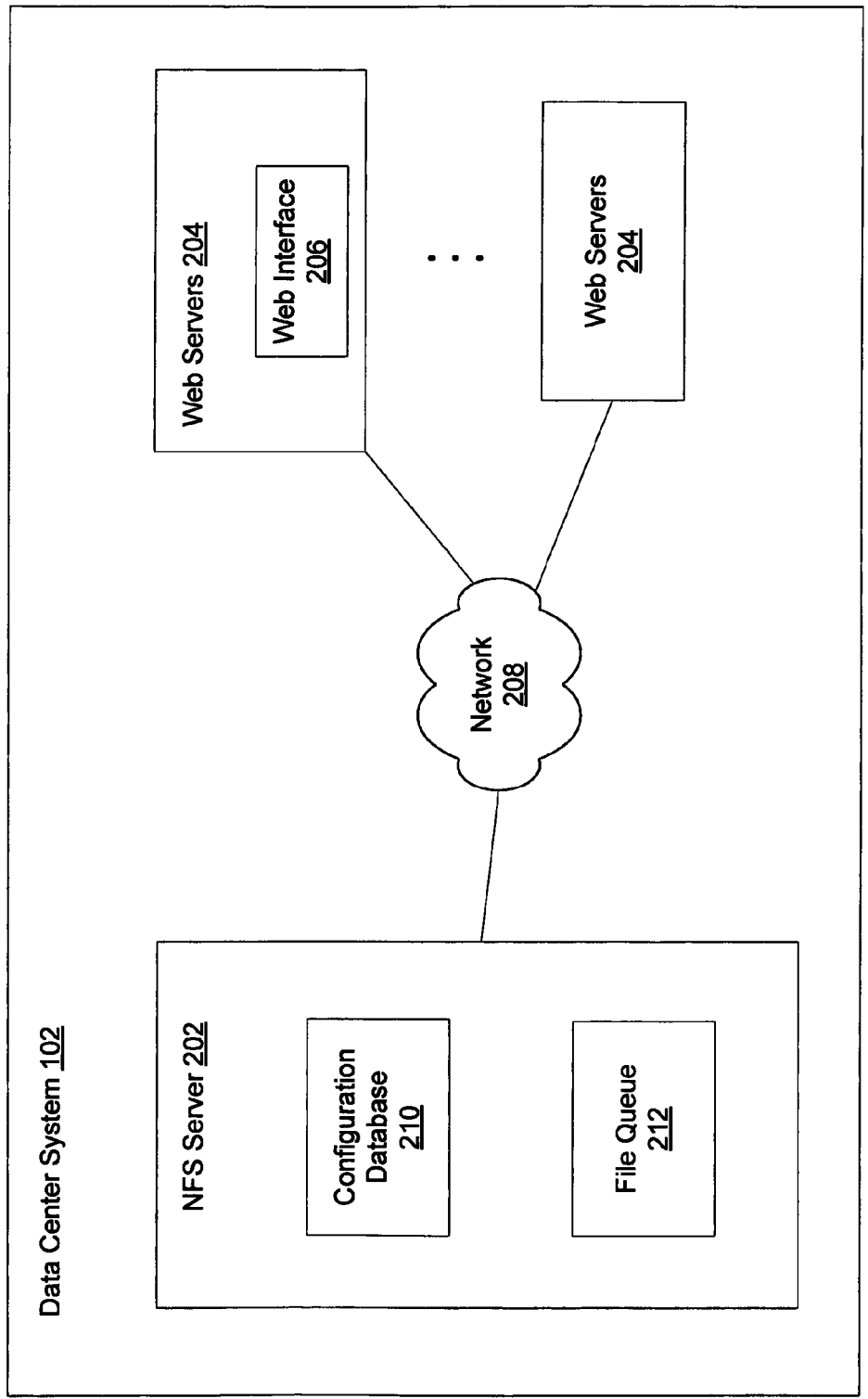
FIG. 2 is a block diagram of an exemplary data center system.

Referring now to FIG. 2, the exemplary data center 102 (also referred to as data center system 102) is shown in more detail. The data center system 102 may comprise a network file system (NFS) server 202 and one or more web servers 204, each of which may comprise a web interface 206, coupled in communication via a network 208. The network 208 may comprise a wide area network (WAN), a local area network (LAN), or a combination of a WAN and LAN.

The NFS server 202 is configured to maintain a configuration database 210 comprising configuration files for the customer sites 106. In exemplary embodiments, the NFS server 202 stores a most current version of each configuration file. In further embodiments, the NFS server 202 may store various versions of each configuration file, such that older versions of the configuration file may be available if needed. The configuration database 210 may be backed up in order to insure that a copy of the current configuration file is available in case of failure by the NFS server 202.

The exemplary web interface 206 provides a user interface for a user (e.g., administrator) associated with a customer site 106 to configure their communication system (e.g., communication servers 108). Configuring may include providing updates as well as establishing a new configuration for their communication system. In exemplary embodiments, the web interface 206 may be embodied within one or more of the web servers 204. In alternative embodiments, the web interface 206 may be embodied within a dedicated server or computing device.

The web servers 204 are configured to generate and synchronize the configuration files. Upon generating the configuration files, the web server 204 stores the configuration file in the configuration database 210 of the NFS server 202. The web servers 204 are discussed in more detail in connection with FIG. 3.

In exemplary embodiments, the NFS server 202 may comprise a file queue 212 used to queue up configuration file for synchronization (i.e., transfer of the configuration file to the communication servers 108). The file queue 212 maintains a listing of configuration files which need to be updated on the customer site 106. The listing on the file queue 212 is maintained until verification that the configuration file has been received and correctly written to the communication server 108 is received. The verification process will be discussed in further detail below.

The file queue 212 may be important in two exemplary instances. First, if the communication server 108 at the customer site 106 is available or unreachable (e.g., the network connection down) or becomes unavailable or unreachable during a file synchronization process, the file synchronization process may be resumed at a later time. The file queue 212 will maintain the configuration file in the file queue 212 until the communication server 108 becomes available or reachable. The synchronization process may then either continue from a point where it previously stopped or start the synchronization process over from the beginning.

In a second example, one of the web servers 204 at the data center 102 may fail or stop operating correctly prior to, or during, synchronization. Because the configuration file is queued up in the file queue 212, a second web server 204 may detect that the configuration file is queued up and awaiting transfer. The second web server 204 may then attempt to synchronize the configuration file. As such, exemplary embodiments of the present invention do not rely on one specific web server 204 to perform the synchronization process.

While the data center system 102 is shown comprising various components, it should be noted that the components and number of components may vary and still be within the scope of exemplary embodiments. For example, any number of NFS servers 202 and web servers 204 may comprise the data center system 102. In another example, the web interface 206 may be embodied within one or more web servers 204.

Figure 3:
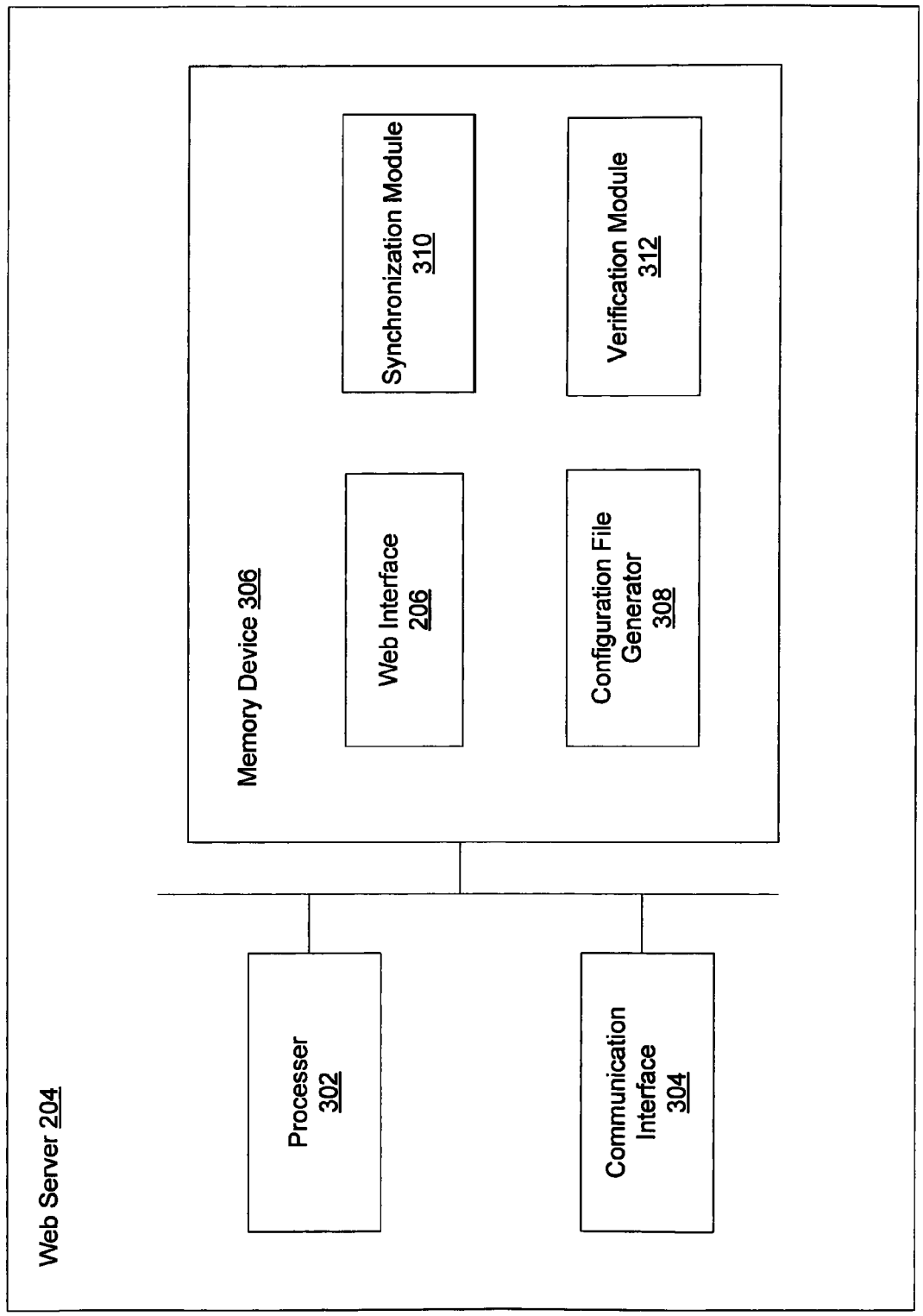
FIG. 3 is a block diagram of an exemplary web server of the data center system.

Referring now to FIG. 3, the exemplary web server 204 is shown in more detail. In exemplary embodiments, the web server 204 may comprise a processor 302, a communication interface 304, and a memory device 306. The communication interface 304 is configured to facilitate communications between the web server 204 and other devices. In various embodiments, the communication interface 304 may comprise ports, other hardware, and/or software that allow for communications to and from the web server 204.

The memory device 306 may comprise storage for a plurality of applications, components, and modules. In the present embodiment, the memory device 306 comprises the web interface 206, a configuration file generator 308, a synchronization module 310, and a verification module 312.

As previously discussed, the web interface 206 (sometimes referred to as a communication interface module) provides a user interface which allows a user associated with the customer site 106 to configure their communication system (e.g., communication servers 108 and communication devices). Configuring may include providing updates and establishing new configurations for their communication system. For example, an administrator for the customer site 106 may create VoIP accounts and establish dial plans via the web interface 206.

The exemplary configuration file generator 308 generates the configuration files based on user inputs provided to the web interface 206. In exemplary embodiments, the configuration file generator 308 will generate the configuration file with knowledge of which communication servers 108 will need the configuration file. For example, a change for one communication server 108 may affect alternate communication servers 108 as well. The configuration file generator 308 will have knowledge of which communication servers 108 will need the new or updated configuration file. Once generated, the web server 204 may store the configuration file in the configuration database 210 of the NFS server 202.

The exemplary synchronization module 310 is configured to determine whether new or updated configuration files are needed at the customer site 106. In some embodiments, the synchronization module 310 checks to see if any configuration files are listed on the file queue 212 and awaiting synchronization. If one or more configuration files are needed or configuration files are listed on the file queue 212, then the synchronization module 310 attempts to send the configuration file down to one or more available communication servers 108.

In some embodiments, the synchronization module 310 may be configured to periodically check the file queue 212 to determine if there are configuration files queued up for synchronization. For example, a first web server 204 may fail in the middle of synchronizing a configuration file. Subsequently, a second web server 204 will detect that the configuration file is still queued up in the file queue 212 and attempt to synchronize the configuration file.

In another example, the communication server 108 may be unreachable for some reason. As such, the configuration file will be queued up in the file queue until the communication server 108 becomes available. At that time, any one of the web servers 204 may detect that the communication server 108 is available and performs the synchronization process. In exemplary embodiments, the synchronization module 310 may periodically attempt to synchronize the configuration file until the communication server 108 is updated. In some embodiments, the attempted synchronization may be performed at a regular interval (e.g., every 5 minutes).

The synchronization module 310 may be further configured to monitor the availability of communication servers 108 and perform a synchronization process whereby the configuration files are synchronized on their respective communication server(s) 108. In exemplary embodiments, the synchronization module 310 checks the communication network 104 to determine if the customer communication server(s) 108 are available and reachable. If the communications servers 108 are available and reachable, then the synchronization process may be initiated.

When a communication server 108 comes online after network connection was cut off and the communication server 108 reestablishes the connection, the communication server 108 may ping the data center system 102. In some embodiments, the communication server 108 may ping the data center system 102 at regular intervals (e.g., every 15 minutes). The ping may comprise a message to the web servers 204 indicating that the communication server 108 is online and inquiring if there are any configuration files available (e.g., in the file queue 212) for the communication server 108. This ping may trigger the synchronization module 310 to verify whether a configuration file is in the file queue 212 for the communication server 108.

In embodiments where the communication server 108 comes online for the first time (e.g., a new communication server 108), the ping may trigger the synchronization module 310 to check for any configuration files stored in the configuration database 210 which should be downloaded to the communication server 108.

The exemplary verification module 312 is configured to verify or confirm that the configuration file has been correctly written to a disk of the one or more communication servers 108. In exemplary embodiments, the verification may be performed using a unique hash value (e.g., generated by a one way hash function). In one embodiment, the unique hash value may be generated based on an MD5 hash of the configuration file that was just downloaded to the communication server 108. The unique hash value is returned to the verification module 312 and compared to a local hash data (e.g., a stored or calculated hash value) at the data center system 102. If the returned hash value matches the local hash data, then the configuration file may be removed from the file queue 212.

In exemplary embodiments, the verification process may be performed for all configuration file downloads. Furthermore, the verification process may be performed for any re-provisioning operations (e.g., if hardware goes bad at the customer site 106). In some embodiments, the verification process may involve a full hash operation on all configuration files associated with the communication server 108 or customer site 106. This full hash operation may include verification for extra files, missing files, and modified files. Any file where the received hash value does not match the local hash data may cause a synchronization of a current version of the configuration file. The verification process will be discussed in more detail in connection with FIG. 6.

Figure 4:
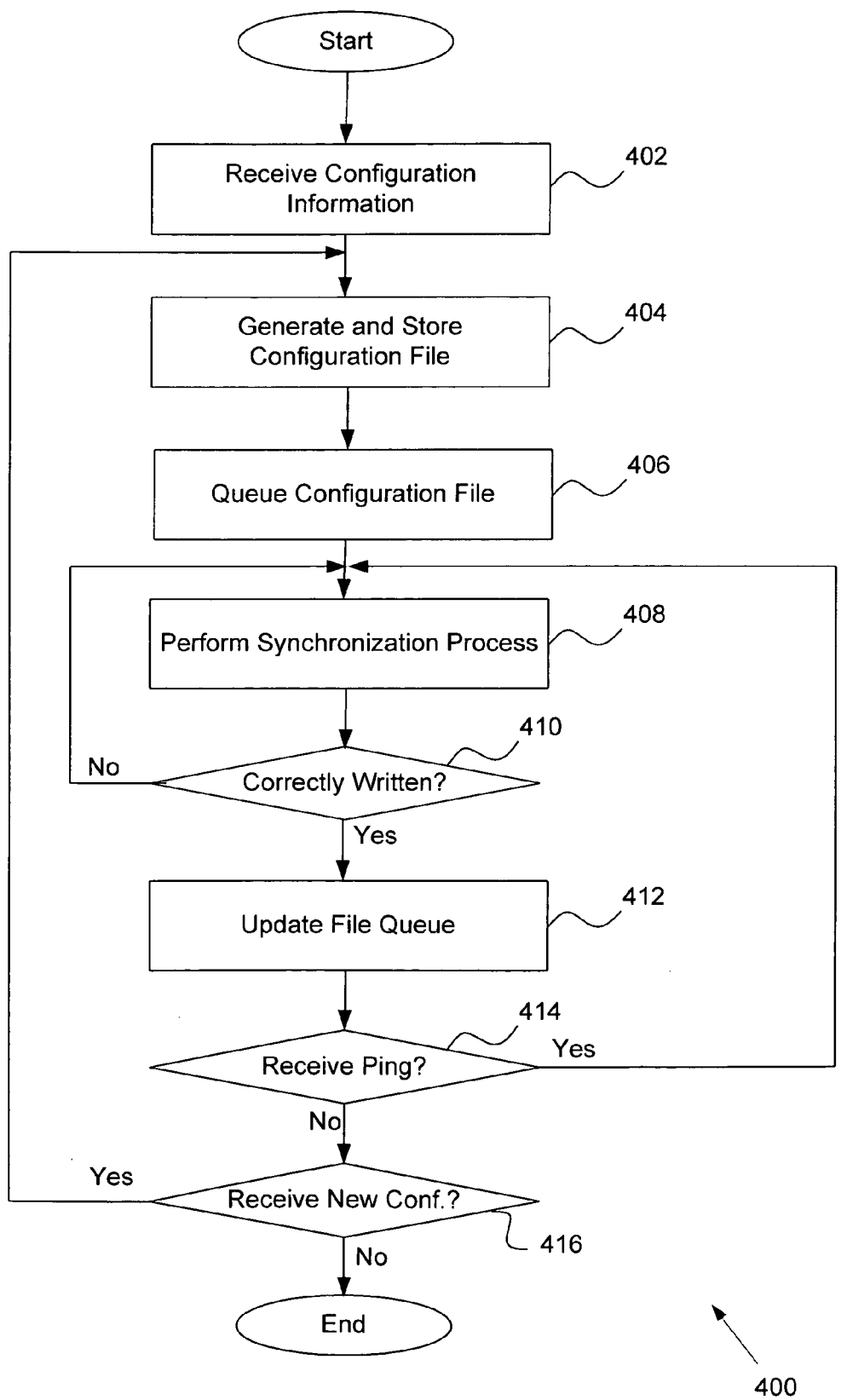
FIG. 4 is a flowchart of an exemplary method for performing configuration synchronicity.

Referring now to FIG. 4, a flowchart 400 of an exemplary method for performing configuration synchronicity is shown. In step 402, configuration information is received at the data center system 102. In exemplary embodiments, a user (e.g., an administrator for the customer site 106) access the web interface 206 of one of the web servers 204. Through the web interface 206, the user provides the configuration information. The configuration information may comprise various preferences for communications routed into and out of the customer site 106.

Once the configuration information is received, configuration files based on the configuration information may be generated and stored in step 404. In exemplary embodiments, the configuration file generator 308 will receive the configuration information and generate the configuration file accordingly. Once generated the configuration file may be stored to the configuration database 210 of the NFS server 202.

Substantially simultaneously with the storing of the configuration file in the configuration database 210, the configuration file may be queued up in the file queue 212 for download to the customer site 106 in step 406. The file queue 212 maintains a listing of configuration files which are awaiting synchronization with the communication server 108 of the customer site 106.

In step 408, the synchronization process is performed. In some embodiments, the configuration file may be sent to the appropriate one or more communication servers 108 immediately after generation by the configuration file generator 308. In other embodiments, the configuration file may be queued up on the file queue 212 for a delayed synchronization process. Step 408 will be discussed in more detail in connection with FIG. 5 below.

In step 410, a verification process is performed to confirm that the configuration file has been written correctly to a disk of each communication server 108 which was supposed to receive the configuration file. In exemplary embodiments, verification is based on matching a hash value received from the communication server 108 to a stored hash value at the data center 102. Alternative embodiments may contemplate using other forms of verification processing. The verification process will be discussed in more detail in connection with FIG. 6. If verification is received, then the configuration file may be removed from the file queue 212 in step 412.

If the verification module 312 cannot confirm that the configuration file has been correctly written to disk on the communication server 108 in step 410, then the synchronization process may be performed again in step 408.

In some embodiments, the web server 204 may receive a ping from the communication servers 108 in step 414. The ping comprises a request from the communication server 108 for any updated or new configuration files which should be sent down to the communication server 108. If a ping is received, then the method proceeds to step 408 which will be discussed in more detail in FIG. 5.

However, if no ping is received, the web server 204 may monitor to detect if new configuration information is received in step 416. If new configuration information is received, then the method proceeds to step 404, whereby a new or updated configuration file is generated, stored, and provided to the communication servers 108.

It should be noted that the method of FIG. 4 is exemplary. Alternative embodiments may contemplate more or less steps or perform the steps in a different order and still be within the scope of exemplary embodiments. For example, the queuing step 406 may be removed such that the configuration file may be automatically sent upon generation. Furthermore, while the pinging step 414 and/or the receipt of new configuration information step 416 are only shown occurring once in the flowchart 400, these steps 414 and 416 may not occur at all and/or may occur multiple times.

Figure 5:
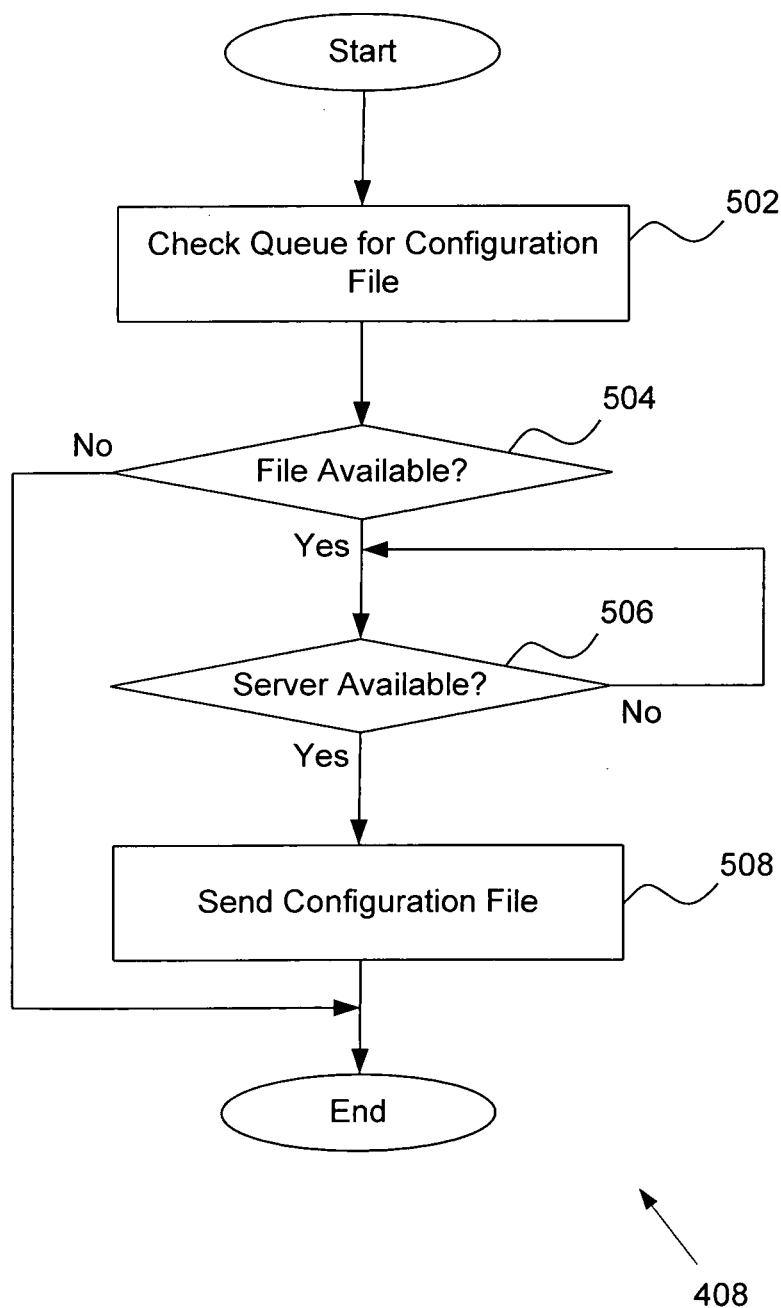
FIG. 5 is a flowchart of an exemplary method for providing configuration files.

Referring now to FIG. 5, the exemplary synchronization process (step 408) is shown in more detail In step 502, the synchronization module 310 checks the file queue 212 for any configuration files that are awaiting transfer to their appropriate communication server(s) 108. In some embodiments, the configuration file may be one that the particular web server 204 recently generated. In other embodiments, the configuration file may have been generated by another web server 204 of the data center system 102.

If a configuration file is queued up for transfer in the file queue 212 in step 504, then a determination is performed in step 506 to detect whether the one or more communication servers 108 indicated to receive the configuration file are available. In some instances, the communication server 108 may be offline, failing, or unreachable. If the communication server 108 is not available, then the web servers 204 will wait a certain period of time before checking the availability of the communication server 108 again. However, if the communication server 108 is available, then the configuration file is sent in step 508.

It should be noted that more than one communication server 108 may need to be updated with the same configuration file. For example, a configuration change to one communication server 108 may affect alternate communication servers 108 as well. The configuration file generator 308 will be aware of these dependencies in communication servers 108 and generate the configuration file accordingly. Subsequently, if one of the communication servers 108 of a plurality of communication servers 108 is unavailable to receive the updated configuration file, then the configuration file may only be sent to the available communication servers 108 in accordance with exemplary embodiments. The configuration file will remain in the file queue 212 until all of the communication servers 108 are sent the configuration file.

Figure 6:
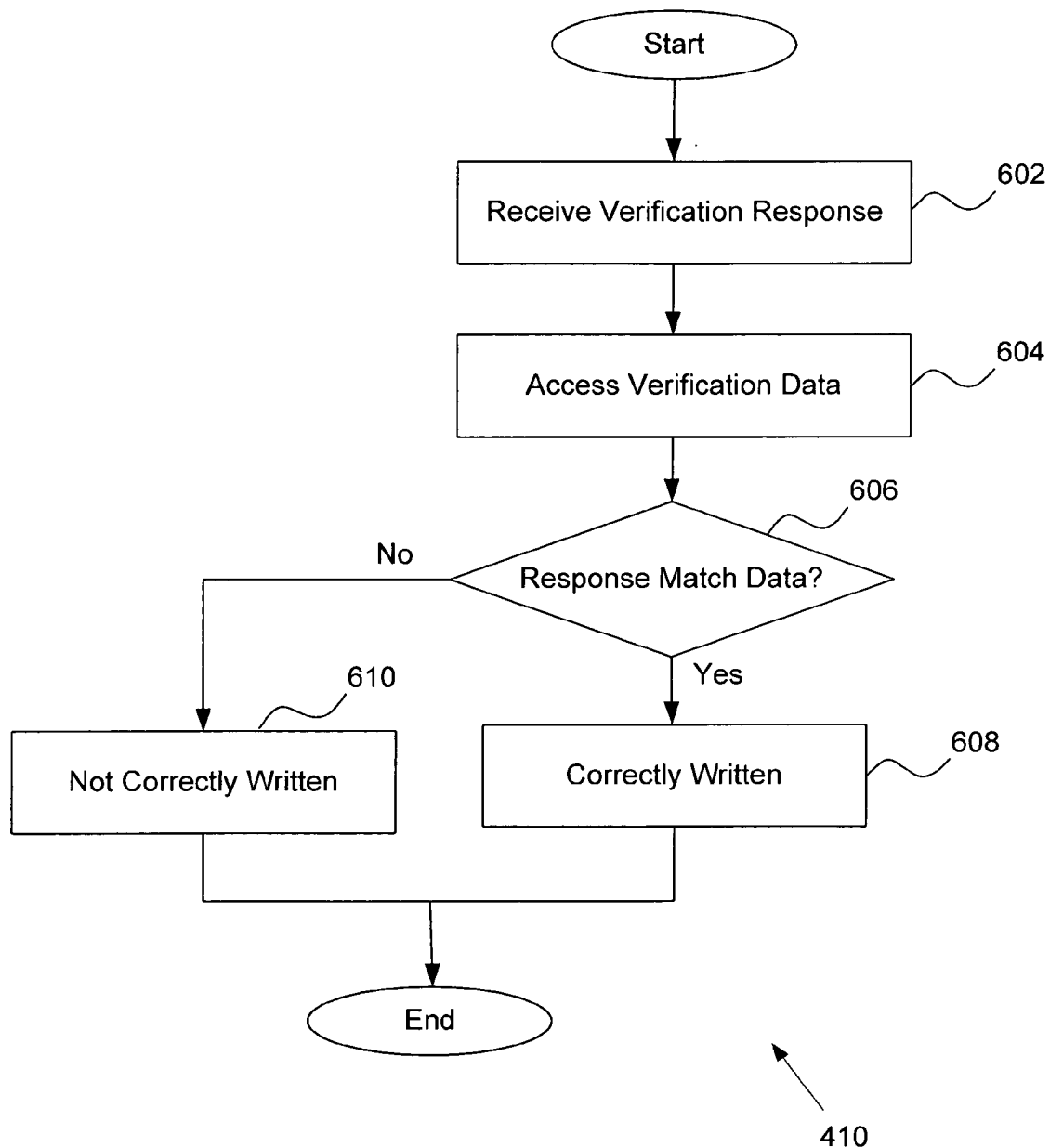
FIG. 6 is a flowchart of an exemplary method for verifying configuration files are synchronized.

FIG. 6 illustrates the exemplary verification process (step 410). Once the configuration file is sent to the communication server 108, the verification process is triggered. In exemplary embodiments, the communication server 108 receiving the configuration file will perform a hash operation on the received configuration file. The result of this hash operation may then be sent back to the data center system 102. A verification module 312 at one of the web servers 204 will receive the hash value as a response in step 602.

Once received, the verification module 312 will access local hash data generated for the sent configuration file. In exemplary embodiments, the local hash data may have been generated by the configuration file generator 308 upon the generation of the configuration file and stored in the configuration database 210 of the NFS server 202. As such, the verification module 312 will access the NFS server 202 to retrieve the local (stored) hash data. In an alternative embodiment, the web server 204 (e.g., the verification module 312) may generate the local hash data upon receiving the hash response from the communication server 108.

In step 606, the hash response is compared to the local hash data obtained in step 604 to determine if there is a match. If there is a match, then the configuration file has been correctly written to disk at the communication server 108 in step 608. If there is no match, however, then the configuration file has not been correctly written to the disk in step 610 and the web server 204 will attempt to synchronize the configuration file again (step 408).

It should be noted that the methods of FIG. 5 through FIG. 6 are exemplary methods. Alternative embodiments may contemplate different steps, combination of steps, or different order to the steps and still be within the scope of exemplary embodiments.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. For example, while exemplary embodiments have been discussed with reference to configuration files in a communication system, the present invention may be practiced in any type of computing system which requires synchronization of files. Therefore, these and other variations upon the exemplary embodiments are intended to be covered by the present invention.

The invention claimed is:

1. A method for providing configuration synchronicity, comprising:
    generating a configuration file based on received configuration information;
    queuing the configuration file within a file queue at a first server;
    detecting by a second server that the configuration file is in the file queue at the first server;
    receiving a ping request from one or more communication servers for the configuration file;
    synchronizing transfer of the configuration file by the second server to the one or more communication servers to configure the one or more communication servers;
    verifying that the configuration file is correctly written by the one or more communication servers; and
    removing the configuration file from the file queue upon the verification.

2. The method of claim 1 further comprising storing the configuration file in a configuration database.

3. The method of claim 2 further comprising checking by the second server for configuration files stored in the configuration database;
    wherein the ping request from the one or more communication servers for the configuration file is received by the second server.

4. The method of claim 1 wherein synchronizing transfer of the configuration file comprises checking the file queue by the second server for one or more available configuration files for the one or more communication servers.

5. The method of claim 1 wherein synchronizing transfer of the configuration file comprises determining whether the one or more communication servers are available for receipt of the configuration file.

6. The method of claim 1 wherein verifying the configuration file is correctly written comprises applying a hash operation to the configuration file.

7. The method of claim 1 wherein verifying the configuration file is correctly written comprises comparing a received hash response from the one or more communication servers to local hash data.

8. The method of claim 7 further comprising generating the local hash data based on the configuration file.

9. The method of claim 1 further comprising:
detecting by a third server that the configuration file is in the file queue at the first server; and
synchronizing transfer of the configuration file by the third server to the one or more communication servers to configure the one or more communication servers.

10. A system for providing configuration synchronicity, comprising:
a configuration module, stored in a memory of a first server and executable by a processor of the first server, and configured to generate a configuration file based on received configuration information;
a synchronization module in a second server configured to synchronize transfer of the configuration file to one or more communication servers to configure the one or more communication servers, the synchronization module configured to receive a ping request from the one or more communication servers for the configuration file;
a verification module configured to verify that the configuration file is correctly written by the one or more communication servers; and
a file queue in the first server configured to queue the configuration file for delivery to the one or more communication servers.

11. The system of claim 10 further comprising a configuration database configured to store the configuration file.

12. The system of claim 11 further comprising checking by the second server for configuration files stored in the configuration database;
wherein the ping request from the one or more communication servers for the configuration file is received by the second server.

13. The system of claim 10 wherein the synchronization module is further configured to check the file queue for one or more available configuration files for the one or more communication servers.

14. The system of claim 10 wherein the synchronization module is further configured to determine whether the one or more communication servers are available for receipt of the configuration file.

15. The system of claim 10 wherein the verification module is configured to verify the configuration file is correctly written by comparing a received hash response from the one or more communication servers to local hash data.

16. The system of claim 10 wherein the verification module is further configured to remove the configuration file from a file queue when the configuration file is verified to have been correctly written to all of the one or more communication servers.

17. The system of claim 10 further comprising a web interface configured to receive the configuration information used to generate the configuration file.

18. The system of claim 10 further comprising the one or more communication servers, the one or more communication servers configured with a unique customer identifier used to identify the one or more communication servers for receipt of the configuration file.

19. The system of claim 10 wherein the synchronization module is further configured to verify whether the configuration file is in the file queue for the one or more communication servers.

20. The system of claim 19 wherein verifying whether the configuration file is in the file queue for the one or more communication servers is triggered by sending a message to web servers indicating that the one or more communication servers are online and inquiring if any configuration files are available.

21. A non-transitory machine readable medium having embodied thereon a program, the program providing instructions for a method for providing configuration synchronicity, the method comprising:
generating a configuration file based on received configuration information;
queuing the configuration file within a file queue at a first server;
detecting by a second server that the configuration file is in the file queue at the first server;
receiving a ping request from one or more communication servers for the configuration file;
synchronizing transfer of the configuration file by the second server to the one or more communication servers to configure the one or more communication servers;
verifying that the configuration file is correctly written by the one or more communication servers; and
removing the configuration file from the file queue upon the verification.

22. The non-transitory machine readable medium of claim 21, wherein the method further comprises checking by the second server for configuration files stored in a configuration database;
wherein the ping request from the one or more communication servers for the configuration file is received by the second server.

* * * * *